United States Patent [19]

Naughton

[11] Patent Number: 5,422,047
[45] Date of Patent: Jun. 6, 1995

[54] CARBONACEOUS FUEL PARTICLES

[75] Inventor: Timothy D. Naughton, Palmdale, Calif.

[73] Assignee: The United States of America as represented by the Secretary of the Air Force, Washington, D.C.

[21] Appl. No.: 221,429

[22] Filed: Mar. 31, 1994

[51] Int. Cl.$^6$ .................. G21C 3/02; G21C 21/00
[52] U.S. Cl. .................. 264/0.5; 252/635; 376/411
[58] Field of Search .............. 252/634, 635; 264/0.5; 376/411

[56] References Cited

U.S. PATENT DOCUMENTS

| | | | |
|---|---|---|---|
| 3,472,922 | 10/1969 | Knotik et al. | 264/0.5 |
| 3,535,264 | 10/1970 | Hackstein et al. | 252/634 |
| 3,671,453 | 6/1972 | Triggiani et al. | 964/0.5 |
| 3,826,753 | 7/1974 | Elson et al. | 252/634 |
| 3,944,638 | 3/1976 | Beatty | 264/0.5 |
| 3,978,177 | 8/1976 | Huschka et al. | 264/0.5 |
| 4,011,289 | 3/1977 | Noothout et al. | 264/0.5 |
| 4,035,452 | 7/1977 | Davis et al. | 264/0.5 |
| 4,202,793 | 5/1980 | Bezzi et al. | 264/0.5 |
| 4,507,267 | 3/1985 | Hinssen et al. | 423/4 |
| 4,963,758 | 10/1990 | Noren et al. | 264/0.5 |
| 5,037,606 | 8/1991 | DeVelasco et al. | 376/411 |

*Primary Examiner*—Behrend E. Harvey
*Attorney, Agent, or Firm*—Thomas C. Stover; Stanton E. Collier

[57] ABSTRACT

Provided is a method for making high-temperature high-performance fuel particles wherein fertile or fissile metal carbides are dispersed in spherical graphite skeletons. That is, a fissile metal salt, such as uranyl nitrate, is added to an aqua-mesophase in alkaline solution, to form a fuel solution. The fuel solution is added to an oil bath to form an emulsion of aqueous pitch-derrived spheres in oil. The emulsion is heated and stirred to drive water from the spheres to dry them into solid spheres which contain the above metal salts. The solid spheres are then heated to between 700–1100 C. to carbonize them and convert the metal salts to metal oxides and then the spheres are further heated to between 2000°–3000° C., to carburize the metal oxides to metal carbides and graphitize the carbon. The resulting fuel spheres are then preferably coated by deposition thereon, of a carbon or carbide coating to contain the future reaction products thereof. The invention includes the above spherical graphite nuclear fuel particles and the method for preparing same.

6 Claims, 1 Drawing Sheet

CARBONACEOUS FUEL PARTICLES

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to carbonaceous fuel particles and method for making same, particularly for making such particles containing fertile or fissile materials.

2. The Prior Art

The most promising or advantageous fuels for high efficiency nuclear power plants or for rocket propulsion have included non-graphite, spherical fuel particles made from sol-gel such as uranium carbide spheres ($UC_2$). Fuel made of such spherical particles however has a molten temperature at about 2654° C. and thus needs to operate below, eg. 2200° C. to avoid significant deformation.

Attempts have been made to find a nuclear fuel that has a significantly higher melting temperature, to reduce the threat of melting and to achieve greater engine efficiency, e.g. for a gas turbine or for improved rocket engine specific impulse. Accordingly there is a need and market for such improved higher temperature nuclear fuel that lessens or obviates the above prior art shortcomings.

There has now been discovered a nuclear fuel that has a significantly higher melting temperature than seen in the prior art and that concurrently can provide for greater efficiency of nuclear engine operation, including that of gas turbines and rocket engines for space vehicles.

In related prior art, U.S. Pat. No. 4,035,452 to Davis et al (1977) discloses impregnating fuel particles with polymer, adding nuclear fuel and then joining the particles into a cohesive mass with a carbonaceous binder. U.S. Pat. No. 4,963,758 to Noren (1990) and U.S. Pat. No. 5,037,606 to DeVelasco, et al (1991) disclose coatings for fuel spheres made by others.

In further prior art, an Article entitled "Preparation of carbon microbeads containing fine platinum particles from aqua-mesophase" Oct. 8, 1991, "Letters to the Editor" in *Carbon*, vol. 30, 1992 at pp. 120 & 122 by K. Esumi, et al., discloses adding platinum to spheres made from aqua-mesophase in silicone oil for use, e.g. as a catalyst. Such microbeads are then heated to 1000° C. to form carbon microbeads. There is no suggestion of preparing a fuel from such process, nor are carbon microbeads converted to graphite microbeads and the size of the microbeads ranges from 10-20 microns.

SUMMARY OF THE INVENTION

Broadly the present invention provides a method for making fuel particles having metal carbides dispersed in spherical graphite skeletons comprising:

a) adding pitch-derived aqua-mesophase to a desired amount of alkaline solution (pH=9-12), to form a first solution,
b) adding a metal salt to the first solution to form a fuel solution,
c) adding said fuel solution to an oil bath to form an emulsion of aqueous spheres in oil and heating and stirring same until spheres with metal salts dispersed therein, dry to form solid spheres in the oil bath,
d) filtering the solid spheres out of the oil bath and rinsing and drying the spheres,
e) heating the solid spheres to 700° C. to 1100° C. for 1-24 hours to carbonize such spheres from pitch to amorphous carbon and convert the metal salts to metal oxides,
f) heating the solid spheres to 2000° to 3000° C. for 2-10 hours, to carburize the metal oxides to form fertile or fissile carbides and graphitize the amorphous carbon to form the fuel particles and
g) depositing a protective carbon-based coating on the fuel particles.

The invention also provides a fuel particle comprising:

a) a spherical graphite skeleton,
b) metal carbides dispersed in the skeleton and
c) a deposit of carbon-based coating covering the skeleton and the metal carbides dispersed therein.

Definitions:

By "dispersed in the skeleton" as used herein, is meant, both in and on the skeleton.

By "pitch" as used herein, is included natural pitch and synthetic pitch.

Natural pitch includes pitch from coal tar and petroleum residues and is discussed at length in *Chemistry and Physics of Carbon*, vol. 15, 1978, pp. 229–286, by H. Marsh and P. L. Walker and references therein, which Article is incorporated herein by reference.

For discussion of synthetic pitch see *Carbon*, vol. 30, 1992, pp. 55–61 by I. Mochida et al and references therein, which Article is incorporated herein by reference.

Aqua-mesophase is a carbon-containing material derived from mesophase pitch, which can be of natural or synthetic origin. For a further discussion of aqua-mesophase material and a discussion of the preparation thereof, see the above cited Article by K. Esumi, which Article is incorporated herein by reference.

By "fissile metal salt" as used herein is meant salts of uranium (U) and plutonium (Pu), including any cation and anion containing U or Pu, e.g. uranyl nitrate, $UO_2(NO_3)_2$, uranyl acetate, $UO_2(CH_3COO)_2$ and uranyl acetylacetonate, $UO_2(C_5H_7O_2)_2$.

By fertile metal salt as used herein is meant salts including any cation and anion containing Th, e.g. $Th(NO_3)_4$ and Thorium nitrate.

The fuel solution is aqueous and when added to the above oil bath, forms an emulsion of liquid pitch-derived spheres in oil. The bath is stirred under heated to, e.g. 80° C. for several hours to drive off most of the water or water vapor, from the pitch-derived spheres (eg to dry and solidify the spheres), many of which remain suspended in the oil bath. Thus in a so dried pitch-derived sphere, e.g. only 10.0 to 0.1 wt % water remains.

By "carbon-based" coating, as used herein, is meant a carbon or carbide coating.

BRIEF DESCRIPTION OF THE DRAWINGS

The invention will become more apparent from the following detailed specification and drawings in which.

DETAILED DESCRIPTION OF THE PREFERRED EMBODIMENT

Figure 1:
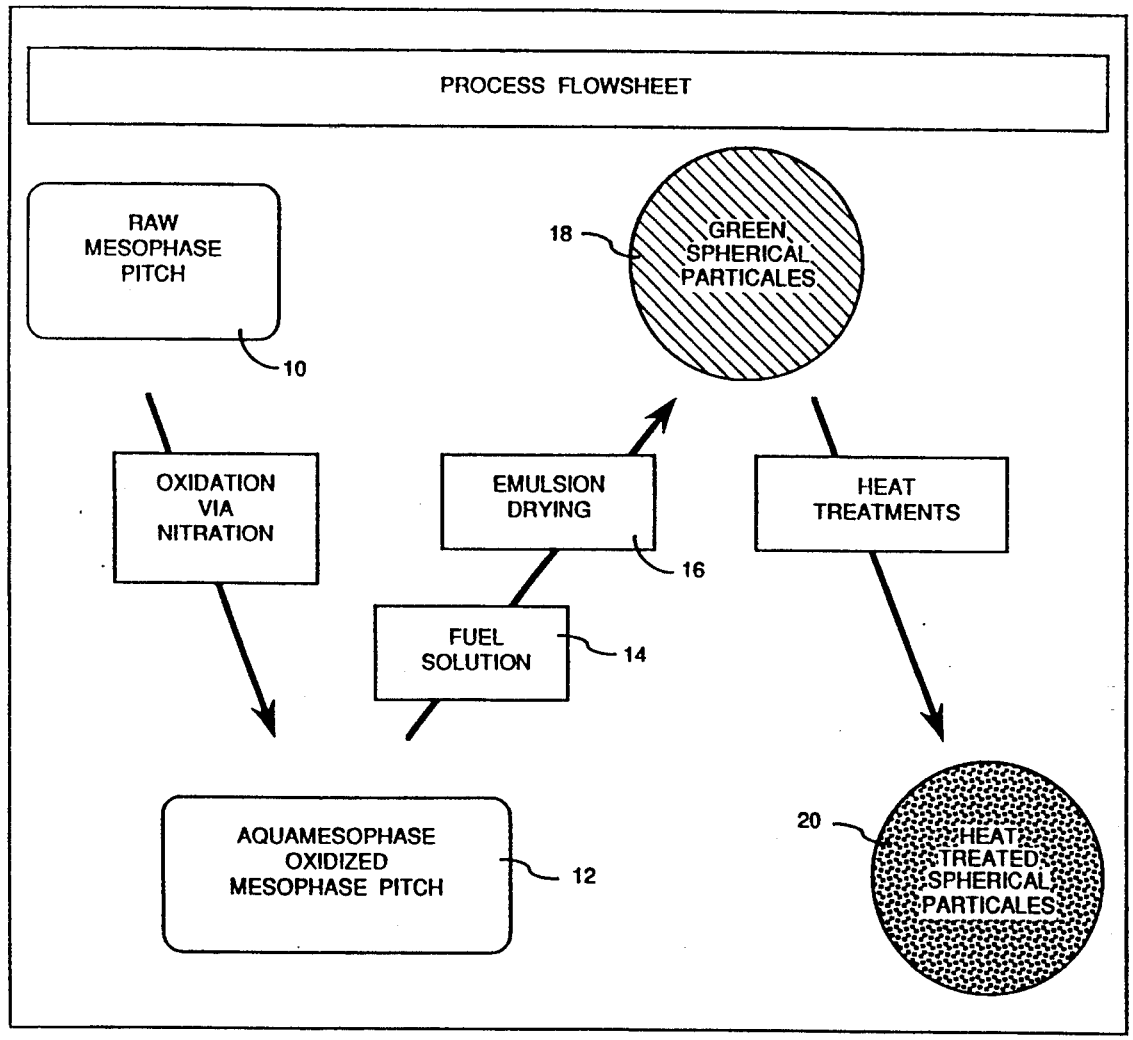
FIG. 1 is a flow sheet depicting a method for making nuclear fuel particles according to the present invention and FIG. 2 is a drawing showing such fuel particles.

Referring in more detail to the drawings, particularly the flow sheet of FIG. 1, it is noted that the oxidation of raw mesophase pitch 10 to aqua-mesophase 12, is considered prior art and not included in the method of the present invention. However, an example of preparation of aqua-mesophase is provided herein as no clear-cut procedure has been noted in the prior art.

Also the adding of aqua-mesophase to alkaline solution (pH=9-12) is also considered prior art.

The method of the invention begins with the next step, that of adding a fissile metal salt to the aqua-mesophase/alkaline solution, as indicated at step 14 of FIG. 1 and further discussed below.

Referring generally to the prior art modification of mesophase pitch:

In the presence of sulfuric acid, nitric acid reacts with aromatic mesophase pitch molecules, R, to form aromatic nitro compounds, $R-(NO_2)_x$.

$$R + HNO_3 \xrightarrow{H_2SO_4} R-(NO_2)_x$$

The nitro compounds are soluble in alkali; the by-products are not. Adding the reaction product to an alkali and filtering through a fine media separates the undesired impurities (caught by the filter media) from the aqua-mesophase (dissolved in the filtrate). The purified aqua-mesophase can then be recovered from the solution by acid-induced precipitation.

Solvation of aqua-mesophase and uranium salt:

Here aqua-mesophase is added to alkaline solution (pH=9-12) to form a first solution as further discussed below. Then a fertile or fissile metal salt is added to such solution to obtain a fuel solution (e.g. at step 14 of FIG. 1) as further exemplified below.

Emulsion drying to form spherical particles:

Here the above fuel solution is added to an oil bath which forms an emulsion, which is stirred and heated for about 2-10 hours until "green" (or early stage) pitch spheres (with metal salts molecularly disperesed therein) are dried and solidified, as noted above and as further discussed below.

The formation of fuel solution spheres in an oil emulsion is influenced by numerous physical parameters. Among these are the viscosities of both oil and fuel solution, the emulsion shear rate, and the interfacial surface tension between the oil and the fuel solution. The shear rate is important because it is the primary determinant of the rate of sphere breakup. Without adequate shearing action by the stirrer, spheres could not be maintained. On the other hand, the ability of spheres, once formed, to coalesce into bigger spheres (which is dictated by the interfacial surface tension) is also critical to the determination of average sphere diameter, as well as the distribution of diameters.

In the above referenced Esumi et al Article, their microbeads or spherical particles ranged in size between 10 to about 20 microns, as stated therein. It is desirable however for purposes of the present invention to increase the size of the spherical particles, e.g. from 40 to 1000 microns and preferably from 100 to 500 microns and more preferably from 200 to 300 microns for easier and more stable positioning of the particles in a particle bed or frit of, eg. a nuclear engine.

The above size increase per the invention, is accomplished by adding an ingredient to the oil bath before adding the above fuel solution thereto. That is, surfactants are added to the oil, as discussed below. The surfactants modify the surface tension between the oil and the fuel solution. Thus per the invention, the green spherical particles can be controlled to a desired size, e.g. between 200 and 300 microns. This is believed a new concept per the present invention.

The so formed spheres are then filtered out of solution, rinsed, and dried after which two heat treatments are applied. In the first heat treatment, the spheres are heated between 700°-1100° C. for 1-24 hours, to carbonize the spheres from pitch to carbon and convert the metal salts dispersed therein, to metal oxides.

In the second heat treatment, such spheres are heated to between 2000°-3000° C. for 2-10 hours, to carburize the metal oxides to metal carbides and graphitize the carbon. Thereafter the so formed graphite spheres are provided a protective coating by vapor depositing a series of carbon or carbide coatings thereon of, e.g. ZrC, TaC, NbC and HfC.

Figure 2:

The so formed spheres or nuclear fuel particles, are shown in the scanning electron micrograph of FIG. 2, at 56.4× magnification where the particles shown, range in size from about 200-300 microns.

At this point a more detailed procedure or preparation of the above spheres according to the flow sheet of FIG. 1 is given below in Example I. Such Example is for illustration purposes only and should not be construed in limitation of the method and product of the present invention.

EXAMPLE I

Step 1, Oxidation of Mesophase Pitch:

This step was conducted as follows:

A) Oxidation via Nitration Reaction:

About 10 grams of powdered mesophase pitch (could be isotropic pitch) was reacted with 200 ml of aqua regia (140 ml concentrated sulfuric acid and 60 ml concentrated nitric acid) at 70°-100° C. for about 3 hours.

B) Product Recovery

The above reaction mixture was added to about 1.8 L of cold deionized water and stirred until thoroughly mixed, e.g. for 8 to 12 hours. A solid reaction product resulted, which was collected by filtering the solution. The filtrate was rinsed with deionized water until the filtrate pH was neutral, i.e. a pH of 5-8. The so rinsed product was then dried, collected and stored in a dry container.

C) Product Purification

The above reaction product was added slowly to a 1N solution of NaOH while stirring. 400 ml of 1N NaOH solution was used per 10 gms of starting mesophase pitch. The mixture was stirred for about 12 hours. Then the NaOH/rxn product solution was filtered through, eg. 0.45 micron filter paper with the insolubles being discarded.

D) Aqua-Mesophase Collection

To the above filtered NaOH/rxn product solution, 1N HCl was added slowly with stirring, until the solution pH equaled 3 or less. Such solution was stirred until the bubbling thereof stopped and the stirring vessel was corked and the solution left to stand overnight, e.g. for about 12 hours.

Then the above mixture was filtered and the filtrate was rinsed with a small volume of cold deionized water and then dried. The so formed purified solid aqua-mesophase was then stored in a dry container.

Step 2 Emulsion Drying:

A) Aqua-mesophase solution preparation.

About 25 ml of $NH_4OH$ solution, with pH=12, was prepared. About 1.25 gm of aqua-mesophase material was added to such 25 ml solution. (A range of 0.03–0.06 gms of aqua-mesophase per ml of $NH_4OH$ solution, is preferably employed in the present procedure).

The above steps are not considered a part of the present invention; however the next steps are:

A fissile metal salt was added to the above solution, typically in the amount of 5–10 wt. % of the metal (depending on the stoichiometry of the salt). In this example the salt was 0.125 gms or 10 wt % uranium nitrate, i.e. of $UO_2(NO_3)_2$ was added.

B) Oil Phase Preparation.

About 500 ml of coconut oil was heated to 50°–100° C. Then 0.1 wt % relative to the oil, of surface active agent or surfactant, was added to the oil, e.g. poly (vinyl alcohol), PVA, with stirring.

C) Emulsion Drying

Using a glass pipet, about 25 ml of $NH_4OH$/aqua-mesophase/fissile salt solution was added drop-wise to the coconut oil/surfactant. The resultant emulsion was then heated to about 80° C. and stirred for about 10 hours or until "green" spherical particles were formed in suspension in the oil bath.

The above spheres were recovered by filtering through 40 micron filter paper. Then the spheres were rinsed with benzene followed by two acetone rinses. Then the spheres were dried, collected and stored in a glass container.

Step 3, Heat Treatment:

A) Carbonization

The spheres were placed in a tray and then heated to carbonization temperatures in an inert atmosphere, i.e. from 20° C. to 700°–1100° C., at the rate of 100° C. increase per hour. The spheres were then cooled to room temperature.

B) Graphitization

The above carbonized spheres were then put into a crucible. The crucible was then covered and placed in a furnace and then heated to between 2000°–3000° C., eg. to 2500° C. in an inert atmosphere at the rate of a 500° C. increase per hour. The spheres were then cooled to room temperature to obtain the end product of the invention, i.e. nuclear fuel spherical particles (e.g. particle 20 of FIG. 1) having a spherical graphite skeleton with fissle uranium carbide dispersed in the skeleton.

Then the above fuel particles were coated by vapor deposition with a series of porous and/or non-porous carbon and carbide coatings to enclose them.

As noted above the above procedure is for illustrative purposes only and various steps and ingredients can be varied within the scope of the invention. For example, the reaction times, heating rates, the amount and type of constituents, including the fertile or fissle metal salt, wherein the amount to be added to form the above fuel solution, depends upon the stoichiometry of the salt.

Also various other oils can be employed in the method of the invention, besides coconut oil, such as vegetable oil, silicone oil, synthetic oils and the like.

The emulsion of fuel solution in oil is heated to a sufficient temperature to drive water from the pitch spheres, such temperature can be between 60°–90° C. and about 80° C. is suitably employed.

Also other surfactants can be employed besides PVA, such as stearic acid, sodium alkyl sulfate where the alkyl (R) has 1–10 carbon atoms, as in $RCHOSO_2ONa$, tri sodium phosphate, $Na_3PO_4$, sodium aryl sulfonate and a glyceryl ester of a fatty acid, eg. $RCOOCH_2CHOHCH_2OH$, where R is 6 to 50 carbon atoms or more.

Also in the deposition coating of the above graphite spheres, one can employ various deposition techniques such as: physical deposition, e.g. magnetron sputtering; conventional chemical vapor infiltration/deposition (CVI/CVD) and plasma assisted CVI/CVD and the like.

The above graphitic spheres are desirably coated to protect them from usage environments and retain future uranium and fission products in the fuel particles. Due to large surface areas and open porosity, the spherical skeleton is best suited for infiltration with vapor species for coating purposes.

Fissile material is introduced to graphite precursor material through a solution chemistry approach as indicated above. The solution is flexible with a wide range of process parameters which can be altered to optimize the performance of the skeleton. Such skeleton exhibits a unique microstructure and morphology. The micro structure is dependent on the solution chemistry which can be altered to optimize performance. The skeleton's morphology contains substantially open porosity which enables vapor infiltration of chemical species to optimize the protection provided by vapor deposition coating thereof.

That is, the method of the invention produces spherical graphite skeletons with finely dispersed fissile material therein. Thus the skeleton is a substrate for a carbon/refractory carbide coating system which enables ultra-high-performance fuel particles.

According to the present invention, high performance fuel particles are provided and method therefor. Such method enables the production of carbonaceous particles containing fertile and fissile materials. By modifying pitch complexes, e.g. by adding functional groups to the aromatic molecules thereof, they become soluble in an aqueous solution. Any complex of a fertile or fissile element that is soluble in the same aqueous solution, can be introduced into the pitch complex through the solution. The aqueous solution is used to form "green" spherical particles which contain the carbonaceous precursor pitch complex and fissile element. The green spherical particles are then modified and pyrolized to form a carbonaceous particle with substantial open porosity and finely dispersed fertile or fissile material.

The method of the invention has the advantage of producing high-performance fuel particles with a spherical graphite skeleton that contains fissle compounds at low cost, with high loadings of fertile or fissile material.

The invention also includes as an end product, a high performance, nuclear fuel particle that functions at higher temperatures without deforming to permit higher efficiency propulsion engines, gas turbine engines and power station generators and the like.

What is claimed is:

1. A method for making fuel particles having metal carbides dispersed in a spherical graphite skeleton comprising:
   a) adding aqua-mesophase to an alkaline solution to form a first solution,
   b) adding a metal salt to said first solution to form a fuel solution,
   c) adding said fuel solution to an oil bath to form an emulsion of aqueous spheres in oil and heating and stirring same until said spheres with said metal salts dispersed therein, dry to form solid spheres, d) filtering said solid spheres out of said oil bath and rinsing and drying same, e) heating said solid spheres to between 700°–1100° C. for 1–24 hours to carbonize them to amorphous carbon and convert said metal salts to metal oxides, f) heating said solid spheres to between 2000–3000 C. for 1–8 hours to graphitize said carbon and to convert said metal oxides to metal carbides to form said fuel particles and g) depositing a carbon-based coating on said fuel particles.

2. The method of claim 1 wherein said metal salt is a fertile or fissle metal salt, which salt has a metal selected from the group consisting of uranium, plutonium and thorium.

3. The method of claim 1 wherein said oil is one selected from the group consisting of coconut oil, vegetable oil, linseed oil, olive oil, and silicone oil.

4. The method of claim 1 wherein before adding said fuel solution to said oil bath, a surfactant is added to said oil bath and stirred therein.

5. The method of claim 4 wherein said surfactant is one selected from the group consisting of PVA, stearic scid, sodium alkyl sulfate, trisodium phosphate and sodium aryl sulfonate.

6. The method of claim 4 wherein sufficient surfactant is added to said oil bath to size the spheres so formed, to between 100–500 microns.

* * * * *